United States Patent Office 3,715,102
Patented Feb. 6, 1973

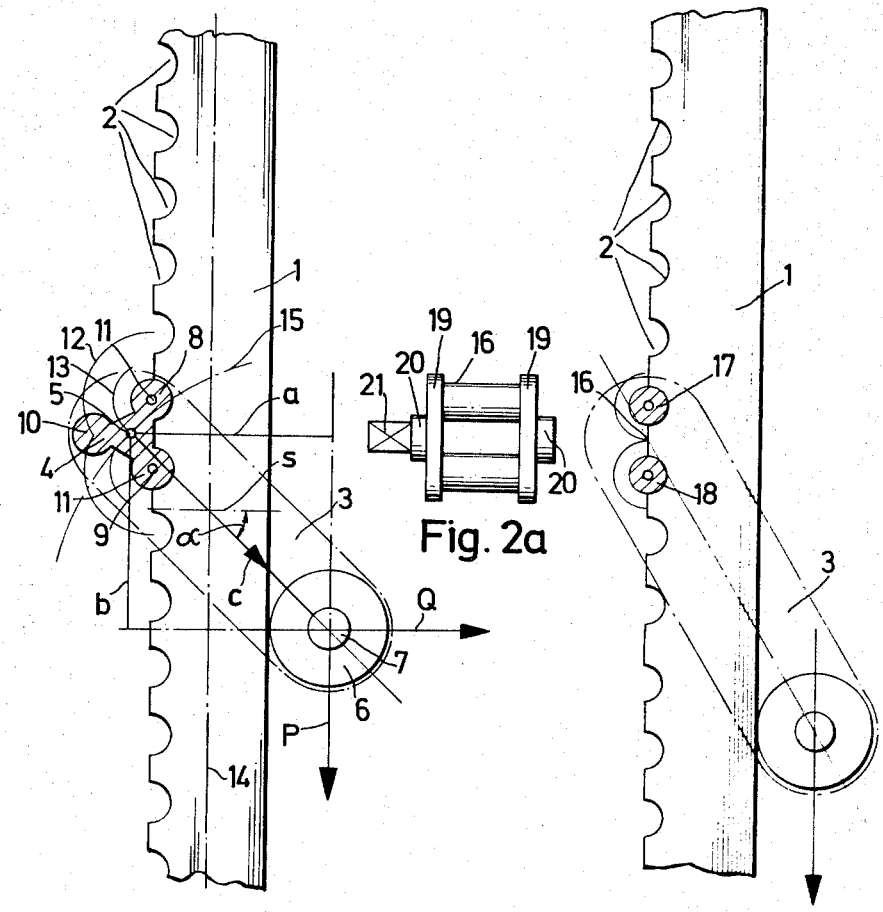

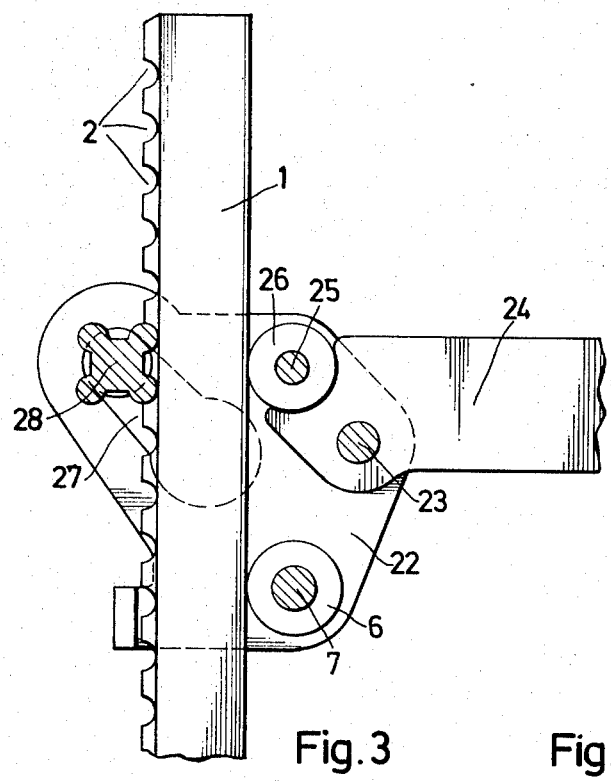
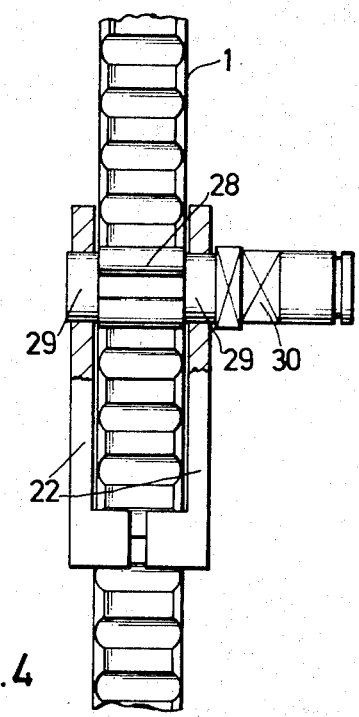
Fig. 3    Fig. 4
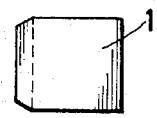
Fig. 5
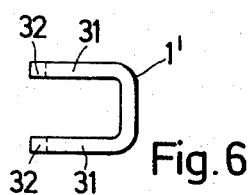
Fig. 6
INVENTOR.
FERDINAND BRASELMANN

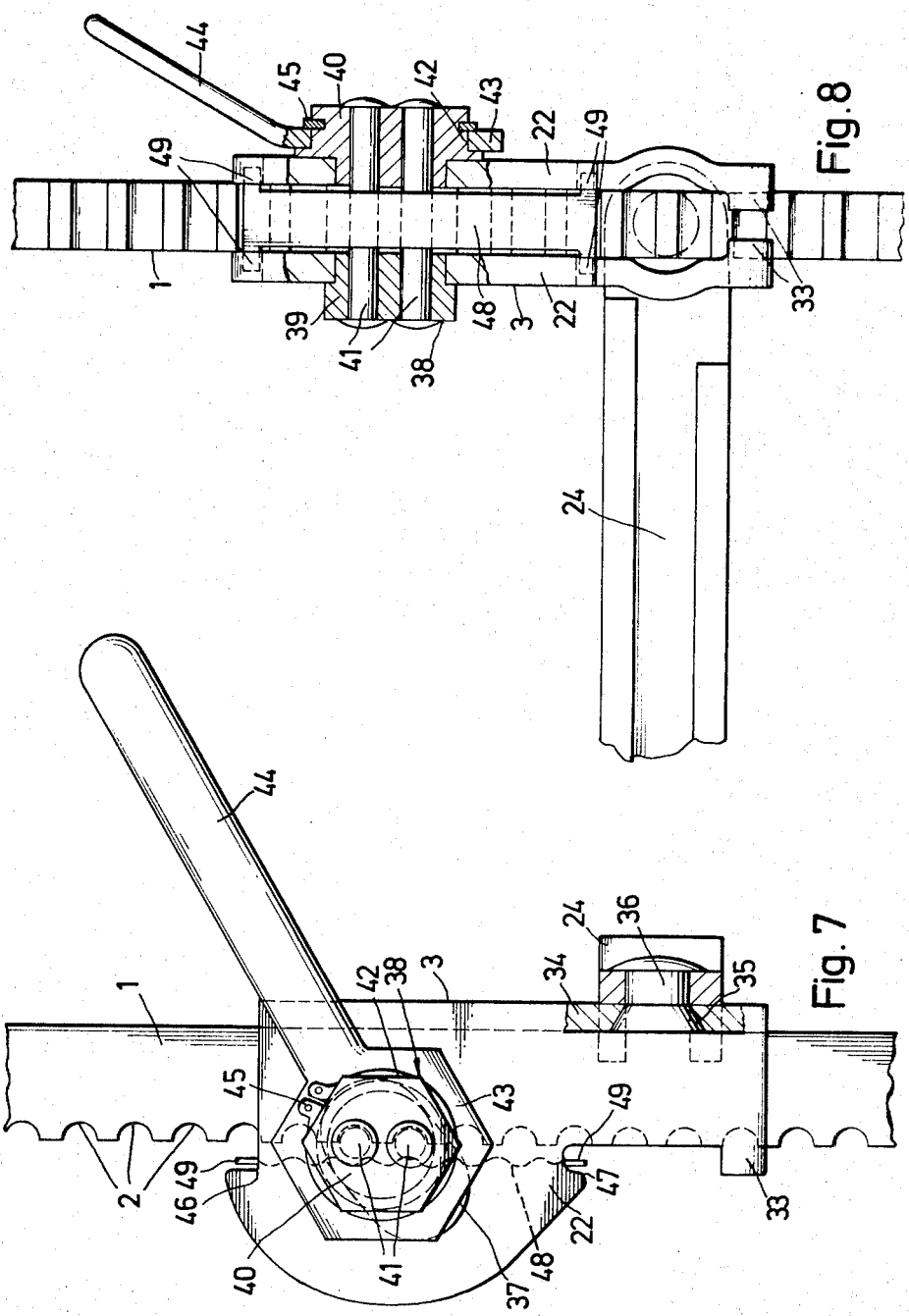

3,715,102
LIFTING JACK
Ferdinand Braselmann, Ennepetal-Oberbauer, Germany, assignor to Firma Ferd. Braselmann, Ennepetal-Oberbauer, Kotthausstrase, Germany
Filed Mar. 2, 1971, Ser. No. 120,105
Int. Cl. B66f 3/08
U.S. Cl. 254—96     8 Claims

ABSTRACT OF THE DISCLOSURE

A jack having a column with equally vertically spaced notches on one side thereof, a load supporting carrier slides along the column and rotatably supports a member having projections complementary to said notches. As the member is rotated the projections sequentially engage said notches and when two adjacent projections are seated in adjacent notches the supported load acts along an oblique line between said projections whereby the carrier and load are self-locking on the column.

---

The present invention relates to a lifting gear and in particular to a lifting jack comprising a column with an engagement profile of grooves disposed at a fixed pitch and comprising an engagement body coupled to a drive lever and rotatable in a carrier element.

Lifting gears of this kind are known in the form of rack jacks wherein the rack profile engages a pinion. Precision machined and surface heat-treated profiles are needed, in order to take up the heavy loads resulting from the line contact of the tooth profiles. In addition, rack jacks require a return feed locking mechanism which must operate as a function of load.

A lifting gear is described in the German patent specification 935,754 wherein the load is clamped fast on a support by tilting action and lifted by the tliting body comprising two rollers which bear against the support on both sides. Herein the friction between support and rollers must be so high that said lifting jack is no longer operable due to the high friction effect involved.

Furthermore, the precision demands pertaining to the fit of the clamping elements cannot be satisfied economically in practice.

It is an object of this invention to provide a lifting gear ensuring reliable operation with comparatively few components which furthermore have to meet minor precision requirements only. In addition, the lifting gear according to the present invention will be of self-locking design.

According to the present invention this problem is solved in that the engagement body comprises at least two segments having a cross-section identical with that of the grooves, said segments being distributed in the corners of a regular polygon, including only two segments, at a spacing equal to the pitch of the engagement profile, and in that the clearance between the middle of said engagement body and said engagement profile is variable during rotation of the engagement body.

The engagement body coacts with the engagement profile as a flapping element similar to a roll joint. Movement of the engagement body is not effected according to the principles of gear teeth, but rather in such a way that one segment would form a roll joint with one grooves of the engagement profile as the toothing body is flapped or folded. It is for this reason also that the pitch of said engagement body is measured by the distance of segments relative to each other and not on the pitch circle as in case of a gear tooth system.

For achieving a locking action beyond dead center position the invention provides for the line of application of the forces created by the weight being lifted to extend through the centerline of said engagement body at an angle relative to a perpendicular to the column which is smaller than or at the most equal to half the pitch angle of the engagement body. Hence, the locking action beyond dead center position is achieved exclusively due to the kinematic design of the lifting gear according to the present invention. Influences of friction are of no importance in this respect. With the jack in unloaded condition, lowering can be effected readily.

The grooves are preferably provided as sections of a regular cylinder and the segments are advantageously formed as segments of a regular cylinder, in order to ensure that one regular-cylinder groove, whenever the engagement body is rotated, is always taken up via comparatively large surface areas so that pressures per unit area are minor ones only. As a result hereof, the requirements to be met in regard to the surface quality of engagement body and engagement profile are kept to a minimum. The required accuracy, too, is a comparatively slight one, as the exact pitch only is of minor importance. The profile as such can be easily made as a circular shape; minor deviations would be compensated during operation. Pressure per unit area and accuracy requirements are substantially less exacting than in the case of a rack jack. Since two segments of the engagement body are always effective under static load conditions, the specific load in holding position is extremely low. The lifting gear according to the present invention can be manufactured economically from few components and is substantially maintenance-free.

Advantageous embodiments of the present invention shall now be described more in detail hereinafter with reference to the accompanying drawings in which:

FIG. 1 is a schematic representation of a first embodiment according to the invention which comprises a triplex type engagement body to explain the basic mode of operation;

FIG. 2 shows a modified embodiment according to the invention with a duplex type engagement body;

FIG. 2a is a view of said duplex type engagement body;

FIG. 3 is a front view of another embodiment of the invention with a quadruplex type engagement body;

FIG. 4 is a side elevation of FIG. 3;

FIG. 5 is a plan view of the column;

FIG. 6 is a plan view of a modified embodiment of said column;

FIG. 7 is an elevation of another embodiment; and

FIG. 8 is a side elevation of FIG. 7.

The lifting jack according to FIG. 1 comprises a column 1 with an engagement profile of half-cylinder grooves 2 disposed at a fixed pitch, that is, equal vertical spacing. A carrier element 3 in which on one hand an engagement body 4 is rotatably mounted for pivoting about a shaft 5 and on the other hand a runner or roller 6 is provided for rotation about the shaft 7, the carrier 3 embracing said column 1. Said carrier element may consist of frame strips or of a bent plate body or may be provided in any other suitable way. The carrier element 3 furthermore comprises a load retaining means (not shown), preferably having the form of a plug-in type mandrel. The engagement body 4 is designed as a triplex engagement body with three regular-cylinder segments 8, 9, 10 arranged in the corners of a regular triangle. The distance between the centers 11 of adjacent regular-cylinder segments relative to each other is equal to the pitch of said half-cylinder grooves 2, the distance between centers being measured on a straight line rather than on a pitch circle as in the case of determination of the pitch for a toothed gear system. A drive lever (not shown) coacts with the engagement body 4 which (lever) can be plugged to shaft 5, for instance, of said engagement body. As the engagement body 4 is rotated in clockwise sense, as viewed in FIG. 1, the carrier element 3 and hence also the load are lifted, during which operation the regular-cylinder segment 8 rotatably engages with the corresponding half-cylinder groove 2 until the regular-cylinder segment 10 moves along the arc 12 to the adjacent half-cylinder groove. The shaft 5 of the engagement body 4 moves on the circular arc section 13. During movement of the engagement body the load is always transmitted from the entire face of any one half-cylinder groove to the column 1 so that pressure per unit area is kept to a minimum. As shown in FIG. 1 two regular-cylinder segments engage with the engagement profile of column 1 in case of static load so that load distribution is even more favorable.

The flipping movement of the engagement body results in a locking action beyond dead center position so that no return feed locking mechanism is required for the lifting gear according to the present invention. The torques acting on said shaft 5 of the engagement body shall now be explained: load P which may act also on some other position than on the shaft 7 of the runner 6 produces together with the load arm $a$ a torque $P \times a$ about shaft 5. The reaction force Q acts upon the contact point between said runner 6 and said column 1 and produces together with arm $b$ the reaction torque $Q \, c \, b$ about said shaft 5. Since the load torque and the reaction torque must be equal according to the principles of mechanics the formula $P/Q = b/a$ applies.

This means that the line of application of the total force is effective on the shaft in the diagonal direction $c$ of said torque arms $a$ and $b$. As readily evident from FIG. 1 the diagonal $c$ extends above the centerline 11 of the regular-cylinder segment 9 and thus holds the engagement body 4 in stop position, for lowering the engagement body in anti-clockwise sense requires a rotary force to be applied to engagement body 4 for such time until diagonal $c$ will pass through centerline 11 of said regular-cylinder and a normal $s$ on the column centerline 14 must be smaller than or at the most equal to half the pitch angle of the engagement body 4. In the example of a triplex type engagement body having a pitch angle of 120° as shown, the angle hence must not be in excess of 60°. This angle $\alpha$ being 60°, an unstable equilibrium is obtained, and the circular arc section 13 for downward movement of said shaft 5 reaches tangential contact with the circular arc 15 about said shaft 7. In the case of the stable equilibrium shown, said circular arcs intersect so that the point of load application must be raised upon rotation of the engagement body 4 in anticlockwise sense, i.e. energy must be applied until dead center is reached.

FIG. 2 represents a modified embodiment according to the invention with a duplex type engagement body 16, the two regular-cylinder segments 17 and 18 of which are held laterally spaced by strips 19. Said strips 19 each carry an annular flange 20 for accommodation in the carrier element 3 and are furthermore provided with a square portion 21 for a drive lever to engage on. In case of a duplex type engagement body the drive lever must permit swivelling through 180°. Said duplex type engagement body substantially ensures a locking action beyond dead center position for all load application points since the pitch angle is 180° and since the resultant may cover a wide angular range.

The specific embodiment according to the invention as shown in FIGS. 3 and 4 comprises a carrier element of opposed side plates 22 having rotatably arranged therebetween said runner 6 on said shaft 7, a plug-in type mandrel 24 on a bolt 23 and finally a flexible roller 26, for instance made of rubber, on a bolt 25. Furthermore, said side plates 22 are provided with longitudinal slots 27 to accommodate a quadruplex type engagement body 28 in contact with the curved walls of said longitudinal slots 27 by means of annular flanges 29. A polygonal profile is provided on the shaft of said quadruplex engagement body 28 for driving engagement by a drive lever. This drive lever may be connected with said engagement body by means of a ratchet stop.

Said flexible roller 26 ensures that the engagement body 28 will remain in engagement with the profile of column 1 in unloaded condition. When turning said engagement body 28 this flexible roller gives way and thus permits outward movement of the engagement body axis relative to the engagement profile as described hereinbefore. Furthermore, said flexible roller also permits a corresponding swivelling movement of the plug-in type mandrel 24 so as to retain the same in horizontal position at all times.

The functional performance of this embodiment of the present invention is readily evident from the above description.

Column 1 may comprise a solid profile as shown in FIG. 5 with half-cylinder grooves 2 formed therein by shaping or milling. On the other hand, as shown in FIG. 6, the column 1' may also consist of a U-shaped plate profile in the legs 31 of which the engagement profile 32 is machined. Preferably said engagement profile 32 will be punched out with the plate in flat condition which is then deformed to U-shape according to FIG. 6 by bending. The engagement body 28 as such can be an extruded section.

FIGS. 7 and 8 represent a particularly advantageous embodiment of the invention. A carrier element 3 bent to U-shape embraces column 1 having the half-cylinder grooves 2. The two legs of this carrier element 3 are opposed to serve as side plates 22. At the lower edge of said side plates 22 provision is made for tongues 33 to hold said carrier element 3 on said column 1. An aperture 35, which permits a plug-in type mandrel 24 to be secured by means of a rivet 36, is provided in the rear portion 34 of said carrier element 3. Said plug-in type mandrel is suitably profiled to support the desired load, but this is not described in detail herein.

For accommodation of the engagement body 38 said shield plates are provided with longitudinal slots 37 in opposed relation to each other. The engagement body consists of two disks 39, 40 connected to each other by means of two engagement segments in the form of pins 41. The relative spacing of said pins 41 corresponds to the spacing of the half-cylinder grooves 2 of said column 1. Said disks 39 and 40 each comprises a circumferential collar by which they extend into one longitudinal slot 37 each. The disk 40 is additionally provided with a hexagon collar 42 for taking up a hexagon ring 43 of an actuating lever 44. This actuating lever 44 is held in place by means of a snap ring 45 or the like engaging an annular groove.

Finally said side plates 22 are provided with recesses 47 above and below said longitudinal slots 37, in order to permit the engagement therein of a corrugated spring band 48 by means of its ends 49. The corrugated spring band is in contact with the pins 41 of said engagement body 38 and urges said pins 41 into engagement with column 1.

The mode of operation of this particular embodiment of the present invention is readily evident from the description hereinbefore. In this embodiment the carrier element 3 is guided on said column 1 in substantially uniform alignment. Inside said carrier element 3 the engagement body 38 is held flexibly, the corresponding biasing for said engagement body being ensured by the corrugated spring band 48. The engagement body 38 is capable of movement inside said longitudinal slots 37. Lifting and lowering of the lifting jack is possible by means of the actuating lever 44 which is turned in clockwise and/or anticlockwise sense as referred to in FIG. 7. Flipping movement of the engagement body as well as the locking function corresponding to the description hereinbefore.

I claim:

1. A lifting device comprising:
   an upright column having vertically spaced transverse grooves on one side thereof;
   a load supporting carrier movable along said column;
   an engagement body rotatably mounted on said carrier, having spaced segments thereon complementary in shape to and receivable in said grooves and spaced apart a distance equal to the spacing of said grooves, said engagement body being further movable toward and from said column in response to rotation thereof;
   said carrier having bearing means engaging the side of said column opposite said grooves at at least one position below said engagement body; and
   means for selectively rotating said engagement body in either direction.

2. A lifting device as defined in claim 1 wherein said carrier is provided with means for supporting a load to be lifted on the side of said column opposite said grooves to thereby apply a resultant inward force to said engagement body, said force acting along a line passing between two adjacent segments of said body when said segments are seated in adjacent grooves.

3. A lifting device according to claim 1, characterized by the fact that said grooves are in the form of regular-cylinder sections and that said segments are formed as regular-cylinder segments.

4. A lifting gear according to claim 3, characterized by the fact that said grooves are in the form of half-cylinder grooves.

5. A lifting device according to claim 1, characterized by the fact that said bearing means includes a flexible roller rotatably disposed in said carrier element in substantially opposed relation to said engagement body, said roller also resiliently suporting a load support.

6. A lifting device according to claim 1, characterized by a solid column.

7. A lifting device according to claim 1, characterized by a column of U-shaped section.

8. A lifting device according to claim 1, characterized by the fact that said carrier element is of U-shaped configuration and wherein its central portion contacts the side of said column opposite to the grooves, the opposed sides each have a longitudinal slot, said engagement body is provided with two engagement segments and is rotatably accommodated in said longitudinal slots, and spring means maintaining said engagement body in contact with said column.

References Cited
UNITED STATES PATENTS

| | | | |
|---|---|---|---|
| 278,317 | 5/1883 | Dawson | 254—95 |
| 287,066 | 10/1883 | Thon | 254—97 |
| 1,029,447 | 6/1912 | Jantzen | 254—97 |
| 2,099,487 | 11/1937 | Johnson et al. | 254—97 |
| 2,688,881 | 9/1954 | Crossland | 254—97 X |

OTHELL M. SIMPSON, Primary Examiner